May 27, 1930.  F. L. MAKER ET AL  1,760,246

APPARATUS FOR HYDROLYZING ACID SLUDGE

Filed April 18, 1927

Inventors
Frank L. Maker
John E. Cooley
Charles F. Tuttle
By Lyon & Lyon
Attorneys Patented May 27, 1930

1,760,246

UNITED STATES PATENT OFFICE

FRANK L. MAKER AND JOHN L. COOLEY, OF BERKELEY, AND CHARLES F. TUTTLE, OF RICHMOND, CALIFORNIA, ASSIGNORS TO STANDARD OIL COMPANY OF CALIFORNIA, OF SAN FRANCISCO, CALIFORNIA, A CORPORATION OF DELAWARE

APPARATUS FOR HYDROLYZING ACID SLUDGE

Application filed April 18, 1927. Serial No. 184,556.

This invention relates to an apparatus for hydrolyzing acid sludge such, for example, as is obtained through the reaction of sulfuric acid upon mineral or petroleum oils.

Acid sludge which is obtained by treating petroleum oil with sulfuric acid can be hydrolyzed into a clean weak acid suitable for concentrating and a liquid tar suitable for fuel, by heating the acid sludge with steam and water and introducing the mass into a closed vessel under suitable pressure, usually around 50 pounds per square inch so that the acid sludge is maintained at a high hydrolyzed temperature for a substantial period of time. The acid sludge and water, on hydrolyzation of the acid sludge, separate into two layers, the top layer comprising tar liberated from the acid sludge and the bottom layer a clean weak acid. Substantially immediately upon bringing the acid sludge and water into contact at a hydrolyzing temperature, the same separates into the tar and acid layers. As this separation first occurs, the tar layer contains a small amount of acid which can be practically eliminated by treating the tar for a short period of time, usually about one-half to three-quarters of an hour. The weak acid produced, however, contains a small amount of tar and must be retorted for a considerably longer period in order to sufficiently free the same from the tar in order that the weak acid can be separately concentrated.

It has been found that as much as several hours are required for treating the acid, the exact time varying, however, for each sludge according to the nature of oil treated and the strength and kind of acid employed in forming the sludge. Moreover, it is found that the tar liberated from the acid sludge by the hydrolyzing process when first liberated is in a liquid condition but if such tar is maintained at the hydrolyzing temperature for long periods of time, it will tend to coke and is difficult to withdraw from the vessel.

In the copending application of Ralph A. Halloran, et al., filed November 15, 1926, Serial No. 148,436, there is described a process for continuously hydrolyzing acid sludge into clean weak acid and liquid tar while permitting the relative retorting times for the acid tar to be independently regulated so that in place of the acid and tar being treated for an equal period of time, the acid is treated for a substantially longer period of time than the tar, whereby there is obtained complete hydrolyzation of the acid and tar without subjecting the tar to an unnecessarily long time of treatment.

The object of the present invention is to provide an apparatus for hydrolyzing acid sludges which may be more readily operated to control the respective treating times of the acid and tar layers.

Another object of the present invention is to provide an apparatus for retorting acid sludge by means of which the treating times of the acid and tar layers may be readily changed as desired.

Another object of the present invention is to provide a vessel having means by which the tar and acid layers produced may be continuously withdrawn, either separately or in a commingled state without interfering with the regulation of the treating times of the acid and tar.

The present invention embodies a vessel having two intercommunicating chambers into which the acid sludge and water may be continuously passed. Said intercommunicating chambers are separated by a baffle, open at its top and bottom whereby the pressure in both chambers is maintained equal and at the same time, the head of liquid in the different chambers is maintained substantially the same. By properly positioning of the discharge outlets for the acid and tar, this arrangement of intercommunicating chambers is made to control the relative volumes of acid and tar within the retort and consequently regulate and control the length of time in which acid and tar are maintained in the retort at the hydrolyzing temperature. This greatly facilitates the operator in maintaining the materials within the vessel for the proper length of time.

The present invention, together with various further objects and advantages thereof, will best be understood from a description of an example of an apparatus for hydrolyzing sludge embodying the present invention. For this purpose, there is hereinafter described one form or example of an apparatus embodying the present invention, said apparatus being described in connection with the accompanying drawings, in which.

Figure 1:
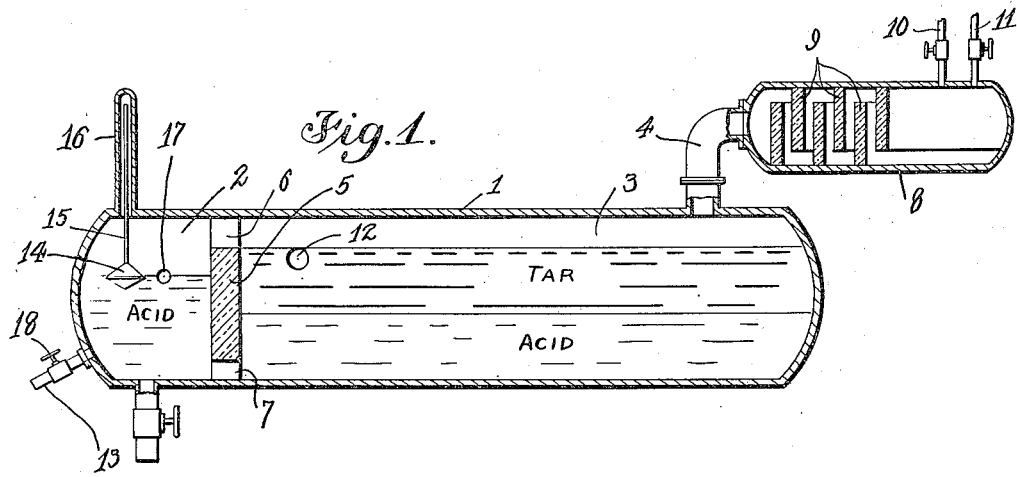
Figure 1 represents a diagrammatic elevation of one form of the apparatus.

Referring first to Figure 1 of the drawings, 1 represents a closed vessel which is preferably suitably insulated against heat radiation. Said insulating means are not specifically shown in the drawings, as they may comprise any usual or preferred form of insulation. The retort 1 is divided into two intercommunicating chambers 2 and 3 by placing a vertical baffle 5 across the chamber. Said baffle 5 is provided with a passage or opening 6 at its top by which the pressure in the chambers may be balanced and with a passage or opening 7 at its lower end. Near the end of the chamber 3, spaced from the baffle 5, there is an inlet line 4 provided by means of which an admixture of acid sludge and water may be introduced into the vessel. Said line 4 preferably leads from a mixer 8 in which the water and acid sludge may be thoroughly commingled before being introduced into the chamber 3. The mixer 8 may be of any desired construction but is indicated as composed of staggered baffles 9 of brick or other suitable material. 10 and 11 respectively indicate lines for introducing acid sludge, water and steam into the mixer 8.

The retort is indicated as provided with means by which the produced tar and acid may be withdrawn either separately from the vessel or withdrawn in a commingled state. After the tar and acid are once thoroughly hydrolyzed, the same readily separate after withdrawal from the vessel, although in certain cases it is preferable to withdraw the tar and acid separately. When the tar and acid are to be withdrawn separately, the tar and gas produced in the vessel are withdrawn through a port 12 which is located in the vessel shell in the same chamber 3 of the vessel as the sludge inlet line 4 and substantially at the level of the upper passage over the baffle 5. An acid draw-off port 13 is located in the vessel shell on the opposite side of the baffle 5 from the tar and gas outlet port 12 and at a low level in the vessel.

Within the second chamber 2 or the acid discharge chamber, there is provided a suitable means for indicating the height of the liquid within said chamber. Said means are indicated as comprising a float 14. The float 14 rides upon the surface of the acid in chamber 2 and is provided with a stem 15 extending vertically upward and guided in an indicating column 16. The stem 15 is preferably calibrated in terms of the ratio of acid to tar contents of the vessel, as will be hereinafter explained.

When it is desired to withdraw the acid and tar from the retort 1 in a commingled stream, the acid and tar are withdrawn from the outlet port 17 which is provided in the shell of the retort 1 within the chamber 2 at a point somewhat below the opening 6 in the baffle 5.

In operation of the apparatus, water and acid sludge are preferably continuously introduced into the vessel and therein maintained at a hydrolyzing temperature. The acid sludge and water may be preheated or heated after introduction into the vessel, but preferably the heating of the admixture is accomplished by injection of sufficient steam into the mixer 8 to raise the mass, together with the heat of hydrolyzation, to the hydrolyzing temperature. Sufficient water is added to the acid sludge so that the sulfuric acid which is produced in the hydrolyzing process will be diluted to a specific gravity usually not greater than 1.526 (50° Beaumé). The hydrolyzing temperature employed is generally between 330° and 375° F., although certain sludges hydrolyze satisfactorily at temperatures quite outside this range.

The admixed materials are thoroughly commingled in the mixer 8 and are therein hydrolyzed to a large extent so that the material in the vessel mainly indicates stratification with a hydrolyzation of the residual acid sludge contained in the tar and acid layers. The pressure employed in the retort usually is in excess of 50 pounds per square inch and may be maintained by a pressure regulating valve on the tar and gas outlet 12.

Within the compartment 3 of the retort 1, the acid and tar formed immediately begins to stratify into separate layers, the tar rising to the top and the acid sinking to the bottom. The tar is continuously withdrawn from the tar outlet 12 while the acid passes through the lower passage 7 in the baffle 5 and flows into the acid chamber 2 of the retort 1 and hence out of the vessel through acid outlet 13. The rate of withdrawal of the acid may be controlled by means of the valve 18 on the acid withdrawal line 13 so that it will not exceed the rate of separation of the acid and tar and the rate of complete hydrolyzation of the acid.

It will be observed that the time during which the acid and tar are respectively maintained in the vessel will depend upon the relative volume of acid or tar layers respectively in the vessel. Thus when a material forming equal volumes of acid and tar is fed into the vessel, if there is maintained in the vessel 1/10 the volume of tar that there is of acid, it will require ten times as long for a given particle of acid to pass through the vessel as would be required for the passage of a given particle of tar. It will thus be seen that by maintaining in the vessel a predetermined volume ratio of acid to tar, the respective treating times for the acid and tar will be controlled. These relative volumes of acid and tar in the vessel are regulated in the following manner:

Since the passage 7 at the bottom of the baffle 5 is free and unrestricted, the column or head of acid in chamber 2 will exactly balance the column of acid or tar in chamber 3. In other words, the depth of acid in the chamber 2 multiplied by the specific gravity of the acid will equal the depth of acid in chamber 3 multiplied by the specific gravity of the acid, plus the depth of tar multiplied by the specific gravity of the tar. Since the relative specific gravities of the acid and tar are known, the stem 15 of the float 14 may be graduated to read directly the ratio of tar and acid in the vessel and the ratio between the volume of acid to volume of tar in the vessel 1 be regulated through regulating the height of acid in chamber 2, to bring the gage 14 to the desired rate. It will be seen that if the acid level in the acid or outlet chamber 2 is maintained very near the top of the baffle 5, an extremely thin layer of tar will be maintained within the vessel. In such a case, the tar will pass quickly out of the system but the acid will be retorted a very considerably longer period of time. On the other hand, if the level of acid in the acid chamber 2 is maintained low, the depth of the tar layer in chamber 3 will be correspondingly deep and the layer of acid in the chamber will be correspondingly shallow so that the treating time for the tar will be longer and that of the acid relatively shorter.

In certain cases, it is desired to withdraw the acid and tar from a single outlet. In such a case, the outlet 17 is employed. When this outlet is being used, the tar outlet 12 is closed and the acid outlet 13 is closed. In this case, the tar within the vessel 1 is caused to overflow the baffle 5 to the surface of the acid in the acid chamber 2 and passes out the outlet 17 along with the acid and gases produced. In this case, the pressure is maintained in the vessel by means of a regulating valve, not shown, on the draw-off line from the outlet 17. The regulation of the relative volumes of acid and tar in the retort may be accomplished by various means, for example, by vertically adjusting the opening 6 in the top of the baffle 5 or by changing the vertical position of the outlet 17.

Figure 2:
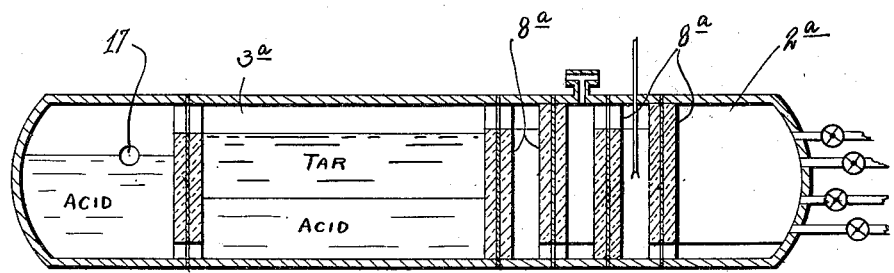
Figure 2 represents a diagrammatic elevation of a modified form of the apparatus.

Now referring to Figure 2 of the drawings, the apparatus there illustrated is generally similar to the form shown in Figure 1 except that the mixer is shown as built into the body of the vessel. Similar parts are, therefore, indicated by the same numerals in both instances. In Figure 2, the steam, water and acid are admitted through the opening $2^a$ and from there passes through the staggered baffles $8^a$ which are shown as disposed in the front end of the chamber $3^a$. In the passage through said baffles, the steam, water and acid sludge are thoroughly commingled and the admixture at once proceeds to separate into acid and tar upon leaving the baffles and entering the balance of chamber $3^a$. The regulation of the relative volumes of acid and tar within the vessel is accomplished by the same means as shown in connection with Figure 1.

While the apparatus shown in the drawings is well adapted for carrying out the objects of the present invention, it is understood that various modifications and changes may be made without departing from the principles of the invention and the invention includes all such modifications and changes as come within the scope of the following claims.

We claim:

1. An apparatus for continuously hydrolyzing acid sludge, which comprises a vessel provided with a baffle dividing the vessel into chambers which are in communication at the top and bottom, an outlet for the tar adjacent the top of said baffle, and an outlet for the acid on the opposite side of said baffle.

2. An apparatus for continuously hydrolyzing acid sludge, which comprises a vessel provided with a baffle dividing the vessel into chambers which are in communication at the top and bottom, an outlet for the tar adjacent the top of said baffle, an outlet for the acid on the opposite side of said baffle, and a level indicating gage in the vessel at the acid outlet side of said baffle.

3. An apparatus for continuously hydrolyzing acid sludge, which comprises a vessel divided by a baffle into intercommunicating chambers, means for causing the relative acid and tar volumes in one chamber of the vessel to vary in accordance with the height of liquid in the other of said chambers, and means for indicating the height of liquid in said chamber.

4. An apparatus for continuously hydrolyzing acid sludge which comprises, a vessel divided by a baffle into intercommunicating chambers, and means for causing the relative acid and tar volumes in one chamber of the vessel to vary in accordance with the height of liquid in the other of said chambers.

Signed at Richmond, California, this 5 day of March, 1927.

FRANK L. MAKER.
JOHN L. COOLEY.
CHARLES F. TUTTLE.